United States Patent [19]
Mayer et al.

[11] Patent Number: 4,885,530
[45] Date of Patent: * Dec. 5, 1989

[54] DEVICE FOR EARLY DETECTION OF BREAKS AND MARGINAL WEAR IN THE CUTTING EDGES OF TOOLS

[75] Inventors: Kurt Mayer, Essen; Volker Richey, Dortmund; Hans-Peter Schneider, Heiligenhaus, all of Fed. Rep. of Germany

[73] Assignee: Fried Krupp, GmbH, Essen, Fed. Rep. of Germany

[*] Notice: The portion of the term of this patent subsequent to May 17, 2005 has been disclaimed.

[21] Appl. No.: 123,257

[22] Filed: Nov. 20, 1987

Related U.S. Application Data

[63] Continuation-in-part of Ser. No. 915,126, Oct. 3, 1986, Pat. No. 4,744,241.

[30] Foreign Application Priority Data

Nov. 22, 1986 [DE] Fed. Rep. of Germany ....... 3639917

[51] Int. Cl.$^4$ .......................... G01N 3/58; G01N 3/56; G01N 27/02; B23Q 17/09
[52] U.S. Cl. ................. 324/61 R; 324/65 R; 73/104; 407/113
[58] Field of Search .............. 73/104, 7; 324/65 R, 324/61 R, 61 P, 61 QS, 61 QL; 340/680; 407/113; 83/72, 522

[56] References Cited

U.S. PATENT DOCUMENTS

| | | | |
|---|---|---|---|
| 3,406,802 | 10/1968 | Needham et al. | 324/61 P |
| 3,550,107 | 12/1970 | Thompson et al. | 324/61 R X |
| 3,641,431 | 2/1972 | Pigage et al. | 324/61 R |
| 4,106,332 | 8/1978 | McKeown | 73/104 |
| 4,168,464 | 9/1979 | Coulson et al. | 324/61 R |
| 4,326,257 | 4/1982 | Sata et al. | 73/104 X |
| 4,694,686 | 9/1987 | Fildes et al. | 73/104 |
| 4,744,241 | 5/1988 | Mayer | 73/104 |

FOREIGN PATENT DOCUMENTS

| | | | |
|---|---|---|---|
| 48246 | 3/1985 | Japan | 73/104 |
| 503164 | 4/1976 | U.S.S.R. | 324/61 R |

Primary Examiner—Tom Noland
Attorney, Agent, or Firm—Spencer & Frank

[57] ABSTRACT

A device for the early detection of breaks and/or marginal wear in the cutting edge in machine tools equipped with reversible cutting plates having at least one insulated conductor path embedded in their cutting edge, with the conductor path being in communication with a voltage source and forming part of a circuit for actuating a signal to break off a machining process. The conductor path is part of an alternating circuit which is connected with the voltage source without physical contact. An induction coil disposed in the tool is able to induce a current in a circuit closed within the cutting plate itself and this current is measured by a measuring coil disposed in the tool. In some embodiments, insulated conductor paths in the reversible cutting plate are capacitively coupled with the voltage source without contacting it.

10 Claims, 4 Drawing Sheets

DEVICE FOR EARLY DETECTION OF BREAKS AND MARGINAL WEAR IN THE CUTTING EDGES OF TOOLS

This is a continuation-in-part of application Ser. No. 915,126, filed Oct. 3, 1986, now U.S. Pat. No. 4,744,241, issued May 17, 1988.

BACKGROUND OF THE INVENTION

1. Field of the Invention

The present invention relates to a device for the early detection of breaks and marginal wear in the cutting edges of reversible cutting plates employed in machine tools, the reversible cutting plates having at least one insulated conductor path embedded in their cutting edges, with this conductor path being in communication with a voltage source and forming part of a circuit for actuating a signal to break off the machining process.

2. Prior Art

Recently, the early detection of breaks in the cutting edges of tools used for machining work has been gaining increasing significance. Various proposals have been made to realize such early detection. For example, a device is known which is particularly well suited for use with tools equipped with so-called reversible cutting plates which are inserted into the tools. Such reversible cutting plates are often coated with non-conductive hard substance layers and it has been proposed to embed conductor paths in the vicinity of the cutting edges in these hard substance layers, with such conductor paths being in communication with a voltage source and forming part of a circuit for actuating a signal to break off the machining process.

In connection with such reversible cutting plates it is necessary to establish contact between the respective conductor paths in the exchangeable cutting plate and the tool. However, this is not only difficult but also has the drawback that such contacts constitute an unreliable electrical connection. They become dirty or corrode easily and become loose with extended use.

SUMMARY OF THE INVENTION

It is therefore an object of the invention to overcome this drawback and to provide a device which permits the establishment of a secure, reliably operating electrical connection between the conductor path in the cutting plate and the voltage source as well as the measuring devices in the tool. This is accomplished according to the invention with a tool having a conductor path which is part of an alternating current circuit and is electrically connected with the voltage source without physical contact.

The conductor path embedded in an insulated manner in the cutting plate may be part of a closed circuit provided therein in which an induction coil provide in the tool induces an alternating current which is measured by a measuring coil disposed also in the tool. The induction coil and measuring coil are advisably disposed in the tool in such proximity to the cutting plate that as many field lines as possible of the alternating field intersect the circuit of the cutting plate.

In addition, the insulated conductor path embedded in the cutting plate may also be in communication with the alternating voltage source without contact by way of capacitor plates. The capacitor plates in the cutting plate may then be formed in surfaces of the cutting plate and made of the same electrically conductive material as that defining the conductor path. Advisably, the capacitor plates are also insulated by a cover layer of non-conductive hard substances. Coatings of aluminum oxide, aluminum oxinitride or silicon nitride are suitable as electrically non-conductive hard substance layers. The electrically non-conductive layers and/or the conductor paths and the capacitor plates may be produced in a known manner in a PVD (physical vapor deposition) or CVD (chemical vapor deposition) process. They may also be produced by other suitable processes such as, for example, screen printing, or with the aid of the thin-film technology. Advisably, the conductor paths are disposed along the major cutting edges. However, they may also be disposed along the secondary cutting edges, with mutually independent pairs of conductor paths being provided for each operating position of the cutting plate.

BRIEF DESCRIPTION OF THE DRAWINGS

These and other features and advantages of the invention will be better understood from the following description of the preferred embodiments with reference to the appended drawings in which.

DESCRIPTION OF THE PREFERRED EMBODIMENTS

Figure 1:
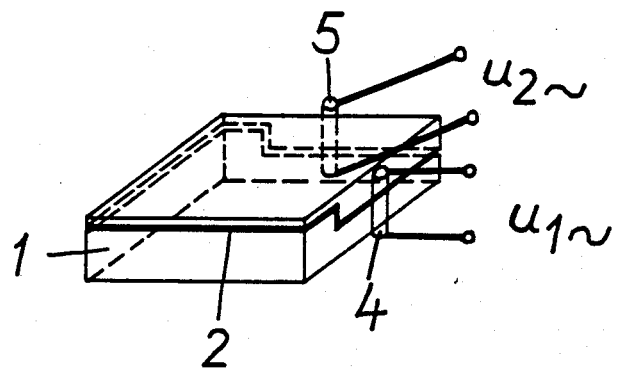
FIG. 1 is a schematic representation of a reversible cutting plate equipped with a device for inductively coupling together the conductor paths in the cutting plate; in accordance with an embodiment of the invention.

FIG. 1 shows a cutting plate 1 for use in a lathe. The basic element of this plate has a core composed of $Al_2O_3$ and $Si_3N_4$ and auxiliary nonconducting components. Its surface is coated with a conductor path 2 which, when not broken, forms a closed circuit that is covered with an insulating layer e.g. silicon nitride. An induction coil 4 disposed in the tool in the vicinity of the cutting plate induces an alternating current in this circuit and this current is measured by a measuring coil 5 likewise disposed in the tool at the cutting plate in the vicinity of the circuit. Since the magnetic flux through conductor path 2 caused by the alternating current in induction coil 4 is subject to changes in time, an alternating current is also induced in conductor path 2 and—since the circuit of the conductor path induces a surrounding alternating magnetic field—this latter current can be measured with the measuring coil 5 disposed at the cutting plate. As long as the circuit is closed, i.e. conductor path 2 ist not interrupted, an alternating voltage directly proportional in its amplitude to the alternating input voltage of the induction coil 4 can be measured at measuring coil 5. If, however, a break or marginal wear occurs, conductor path 2 and thus also the circuit are interrupted, which results in a sudden drop in the signal amplitude of the measuring current induced in the measuring coil. After the break or marginal wear, an alternating voltage continues to be measurable at measuring coil 5 since, due to their close proximity to one another, induction coil 4 and measuring coil 5 are inductively coupled to one another.

Figure 2:
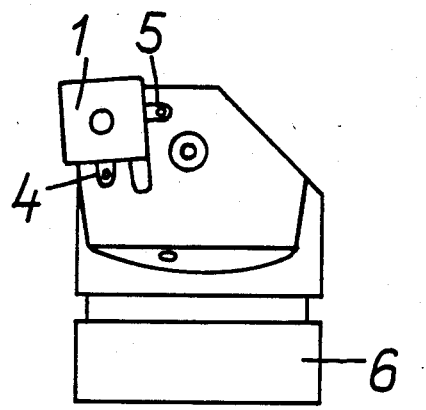
FIG. 2 is a side view of the arrangement of the induction coil and the measuring coil in a tool in accordance with the invention.

FIG. 2 shows a tool 6 equipped with a cutting plate 1 that can be quickly exchanged. The figure shows the arrangement of induction coil 4 and measuring coil 5 in tool 6.

Figure 3:
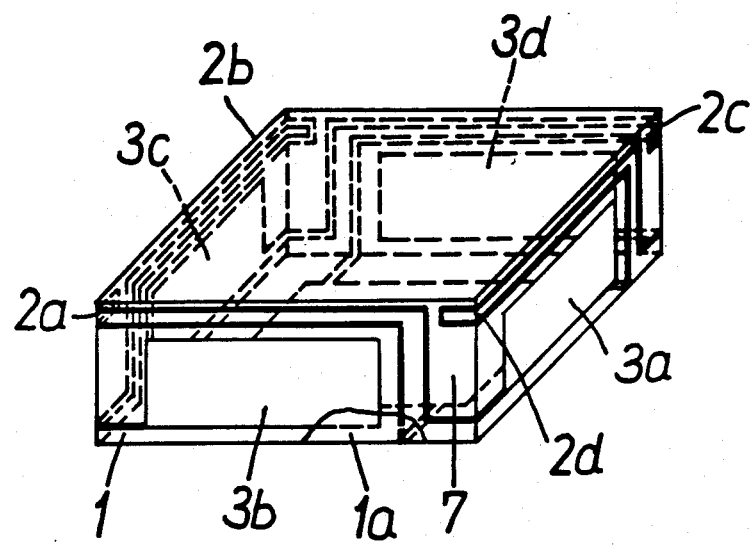
FIG. 3 is perspective represenation of the arrangement of conductor paths and capacitive plates in and edges of a cutting plate in accordance with another embodiment of the invention.

The cutting plate 1 represented in FIG. 3 is a reversible cutting plate in which four cutting edges can be checked for breakage and marginal wear. Four conductor paths 2a, 2b, 2c, and 2d are attached to the blade surfaces at the respective four cutting edges.

Each of the four conductor paths is connected, on the one hand with a separate one of four side capacitor plates 3a, 3b, 3c and 3d attached to an adjacent side of the cutting plate and, on the other hand, with a bottom capacitor plate 7 disposed on the underside of the cutting plate. The conductor paths and the capacitor plates are coated by a known technique on the surface of the nonconducting body with a cover layer (insulation layer) 1a e.g. silicon nitride. The body is composed of $Al_2O_3$ and $Si_3N_4$ and nonconducting components.

Capacitor plates 3a, 3b, 3c, 3d and 7 are composed of the same material as the conductor paths and are produced in the same manner as the latter. They are insulated toward the exterior by the cover layer 1a of nonconductive material.

Figure 4:
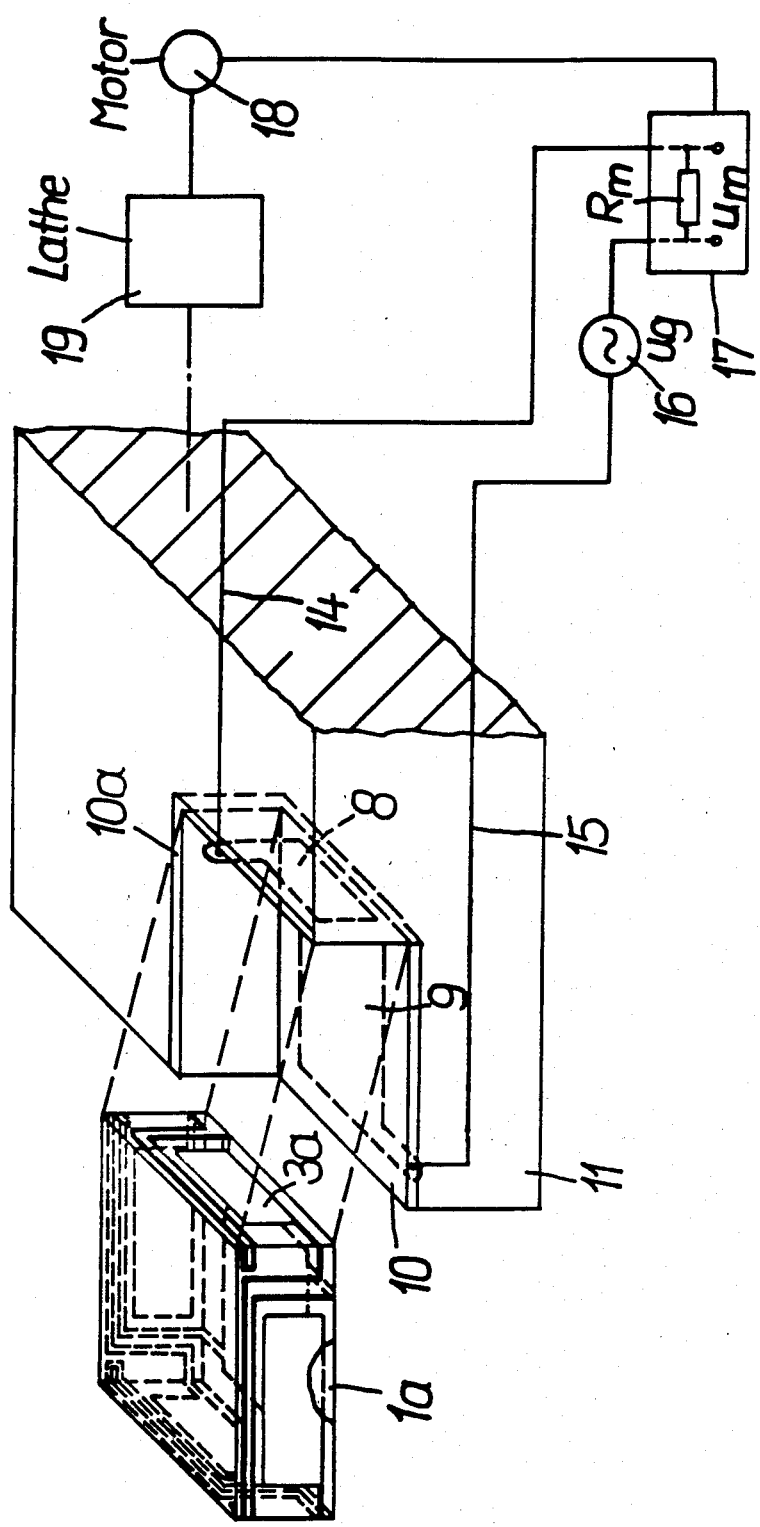
FIG. 4 is a partially exploded perspective view of a cutting plate according to FIG. 3 together with the associated plate seat in the tool and associated machine control circuitry.

The corresponding counterplates (capacitor plates) 8, 9 are embedded, as shown in FIG. 4, in a nonconducting (insulating) cover layer 10a of the plate seat 10 of tool 11.

Also schematically shown in FIG. 4 are connections of the plates 8 and 9 through insulated wires 14 and 15 to circuitry, including an alternating voltage source 16, input resistance $R_m$, and alarm circuit 17, the alarm circuit being reponsive to detection of a voltage drop across $R_m$ indicating a break in conductor path 2 as discussed below (with reference to FIGS. 5 and 6) to stop operation of the motor 18 driving lathe 19.

In FIG. 4, plates 8 and 9 are disposed so as to respectively oppose of one side plates 3a, 3b, 3c and 3d, and bottom plate 7, thereby to define first and second capacitors (hereinafter capacitors $C_1$ and $C_2$). In FIG. 4, plates 3a and 8 define $C_1$ and plates 7 and 9 define $C_2$, and the circuit path would include in order, conductor path 2a, plate 3a, plate 8, conductors 14 and 15 in seat 10 connecting plates 8 and 9, plate 9 and plate 7.

Figure 5:
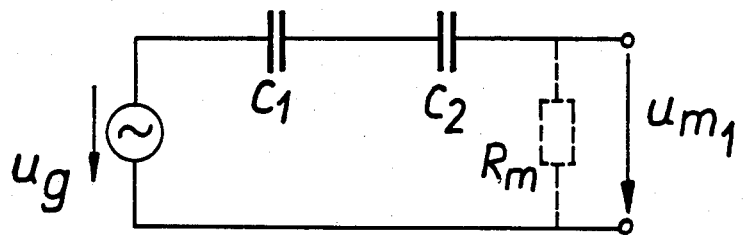
FIG. 5 is an equivalent circuit diagram for the device of FIG. 3 before breakage of the cutting plate.
Figure 6:
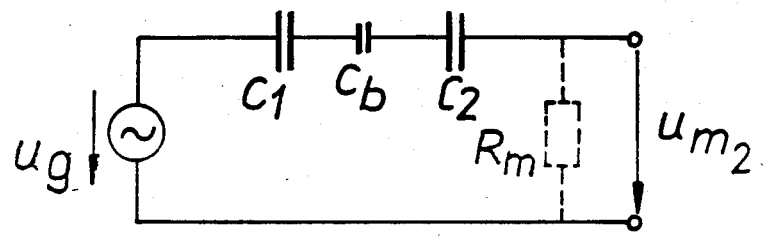
FIG. 6 is an equivalent circuit diagram of the cutting plate of FIG. 3 after breakage of the cutting plate.
Figure 7:
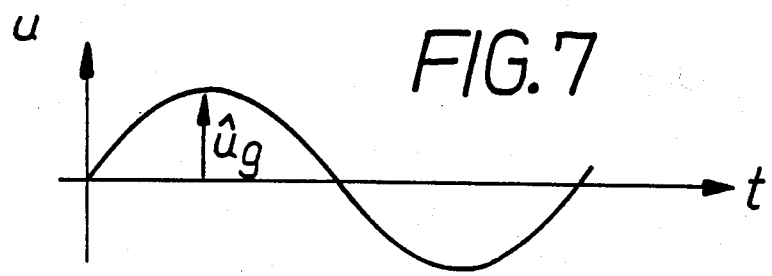
FIG. 7 shows the voltage curves for a corresponding device before and after breakage of the cutting plate.
Figure 7:
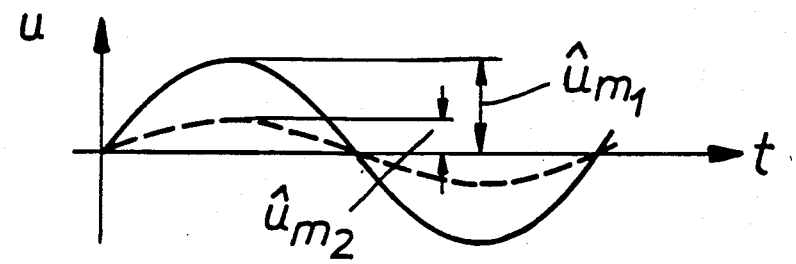

FIGS. 5 and 6 are equivalent circuit diagrams of the measuring principle for use of the invention by means of capacitive coupling. If an alternating voltage is applied by way of a generator to capacitor $C_1$ and to ground, an alternating voltage $\mu_m$ proportional to the input signal can be measured at capacitor $C_2$ and at the ground terminal. According to the formula $\mu_m = k \cdot \mu_g$, this voltage is proportional to the generator voltage. The proportionality constant can here be determined from the fact that the two series connected capacitors $C_1$ and $C_2$ produce a total capacitance of $$C_g = \frac{C_1 \cdot C_2}{C_1 + C_2},$$

where $C_1$ and $C_2$ here represent the capacitances of capacitors $C_1$ and $C_2$. The resistance $R_L$ of the total circuit path then produces a total complex impedance of $$Z_g = R_L + \frac{1}{j\omega C_g}$$

With the input resistance $R_m$ of the measuring stage, the proportionality constant is calculated as follows:

$$k = \frac{R_m}{R_m + Z_g}$$

After a break of the conductor path on the cutting plate, a capacitor $C_b$ (having a capacitance $C_b$) is produced at the point of the break in addition to capacitors $C_1$ and $C_2$, thus changing the total capacitance $C_g$ as follows:

$$C = \frac{C_1 C_2 C_b}{C_1 C_2 + C_1 C_b + C_2 C_b}$$

The curves of the generator voltage and the measuring voltage are shown in FIG. 6. The voltage measured after the break is shown in dashed lines in FIG. 6.

Since the capacitance of $C_b$ has a lower value than that of capacitors $C_1$ and $C_2$, the amount of the impedance $Z_g$ increases and a decreasing constant k results. The amplitude of $\mu_m$ thus decreases after a break of the conductor path.

The second capacitor plates 8, 9 are disposed in a corresponding configuration in the tool in the illustrated embodiment but can alternatively be disposed in intermediate elements between the cutting plate and the tool, and are embedded by a known technique in a non-conductive cover layer 10a e.g. silicon nitride. In a further modification of the invention, a capacitor plate of one conductor path assocfed with one cutting edge may be combined with a capacitor plate of different cutting edges. The capacitor plates in the reversible cutting plate may be disposed in the flanks or also in the bearing face. Finally, it is also possible to arrange capacitor plates in the cutting face, in which case the counterplate is then disposed in the clamping finger of the tool.

The invention now being fully described, it will be apparent to one of ordinary skill in the art that many changes and modifications can be made thereto without departing from the spirit or scope of the invention as set forth herein.

The present disclosure relates to the subject matter disclosed in German Application P No. 36 39 917.5 of Nov. 22nd, 1986, the entire specification of which is incorporated herein by reference.

What is claimed is:

1. A tool in a machine tool used in a machining process, comprising:
    a cutting plate having a cutting edge and having insulated conductor means defining an insulated conductor path embedded in said cutting edge; and
    means for applying an alternating voltage to said path without physical contact therewith, whereby a break in or marginal wear to said cutting edge is detectable as a change in impedance in said path.

2. A tool as in claim 1, further comprising means for operating said cutting plate and means, responsive to a change in the impedance in said path indicative of a break in or marginal wear to said cutting edge, for discontinuing operation of said cutting plate.

3. A tool as in claim 2, wherein said means for discontinuing operation of said cutting plate includes a circuit for actuating a signal to break off the machining process, said circuit including an alternating voltage source in communication with said path and forming a part of said means for applying an alternating voltage.

4. A tool as in claim 1, further comprising a tool holding said cutting plate, said cutting plate having a closed circuit including said conductor path, said means for applying an alternating voltage comprising an induction coil in said tool through which an alternating current associated with the alternating voltage is applied to said closed circuit, said tool further comprising a circuit for measuring the induced alternating voltage, said measuring circuit including a measuring coil disposed in said tool.

5. A tool as in claim 4, wherein said induction coil and said measuring coil are disposed in close proximity to said cutting plate so as to maximize the number of field lines of the alternating field produced by current in said induction coil crossing said closed circuit and thereby the current in said closed circuit and maximize the number of field lines of the field produced by the current in the closed circuit crossing said measuring coil.

6. A tool as in claim 1, wherein said means for applying an alternating voltage includes an alternating voltage source and capacitor plates coupling said voltage source to said conductor path without physical contact.

7. A tool as in claim 6, wherein said capacitor plates have metallic surfaces and said metallic surfaces and said conductor path are formed of a same material, said tool further comprising a covering layer formed of electrically non-conductive hard substances, embedding said metallic surfaces and said conductor path.

8. A tool as in claim 7, wherein said covering layer is composed of a material selected from the group of materials consisting of aluminium oxide, aluminium oxinitride and silicon nitride.

9. A tool as in claim 8, wherein said covering layer, said conductor path and said capacitor plates are formed by a PVD process.

10. A tool as in claim 8, wherein said covering layer, said conductor path and said capacitor plates are formed by a CVD process.

* * * * *